(12) United States Patent
Konetski et al.

(10) Patent No.: US 11,750,654 B2
(45) Date of Patent: Sep. 5, 2023

(54) INTEGRITY ASSURANCE OF A SECURED VIRTUAL ENVIRONMENT

(71) Applicant: Dell Products, L.P., Round Rock, TX (US)

(72) Inventors: David Konetski, Austin, TX (US); Carlton A. Andrews, Austin, TX (US); Ricardo L. Martinez, Leander, TX (US); Abeye Teshome, Austin, TX (US); Joseph Kozlowski, Hutto, TX (US); Charles D. Robison, Buford, GA (US); Girish S. Dhoble, Austin, TX (US); Andrew T. Fausak, Coppell, TX (US)

(73) Assignee: Dell Products, L.P., Round Rock, TX (US)

( * ) Notice: Subject to any disclaimer, the term of this patent is extended or adjusted under 35 U.S.C. 154(b) by 500 days.

(21) Appl. No.: 15/962,406

(22) Filed: Apr. 25, 2018

(65) Prior Publication Data

US 2019/0334951 A1   Oct. 31, 2019

(51) Int. Cl.
| | | |
|---|---|---|
| *G06F 21/62* | (2013.01) | |
| *H04L 41/0893* | (2022.01) | |
| *G06F 9/455* | (2018.01) | |
| *H04L 9/40* | (2022.01) | |
| *H04L 9/32* | (2006.01) | |

(52) U.S. Cl.
CPC .......... *H04L 63/20* (2013.01); *G06F 9/45558* (2013.01); *G06F 21/6218* (2013.01); *H04L 9/3247* (2013.01); *H04L 41/0893* (2013.01); *H04L 63/102* (2013.01); *G06F 2009/45587* (2013.01); *G06F 2221/2141* (2013.01)

(58) Field of Classification Search
CPC .. G06F 21/50; G06F 21/53; G06F 21/57–577; G06F 9/45558; G06F 21/60; G06F 21/606; G06F 21/6218; G06F 2009/45587; G06F 2221/2141; H04L 9/32; H04L 9/3247; H04L 41/0893; H04L 63/10; H04L 63/102; H04L 63/20

See application file for complete search history.

(56) References Cited

U.S. PATENT DOCUMENTS

| | | | |
|---|---|---|---|
| 9,135,436 B2 * | 9/2015 | Lee | G06F 21/53 |
| 9,391,980 B1 * | 7/2016 | Krahn | G06F 21/57 |

(Continued)

*Primary Examiner* — D'Arcy Winston Straub
(74) *Attorney, Agent, or Firm* — Fogarty LLP (57) ABSTRACT

Embodiments provide access to enterprise data via a secured virtual environment hosted on an Information Handling System (IHS), with the integrity of the IHS validated prior to launching the virtual environment. The integrity of the IHS may also be continuously validated during operation of the launched virtual environment. Policies for accessing the enterprise data are stored in a secured memory that is isolated from the operating system of the IHS. A virtual environment is configured, according to the policies, with resources for a particular user to access the enterprise data. If the integrity of the IHS is validated by a trusted resource on the IHS, the virtual environment is launched. During operation of the virtual environment, the trusted resource periodically confirms the integrity of the IHS. If the integrity of the IHS is not verified or policy changes are identified, access to the secured workspace may be revoked.

20 Claims, 4 Drawing Sheets

(56) References Cited

U.S. PATENT DOCUMENTS

| | | | |
|---|---|---|---|
| 2009/0089860 A1* | 4/2009 | Forrester | H04L 9/0897 |
| | | | 718/1 |
| 2010/0107249 A1* | 4/2010 | Krig | G06F 21/57 |
| | | | 726/22 |
| 2011/0060947 A1* | 3/2011 | Song | G06F 21/53 |
| | | | 718/1 |
| 2011/0113467 A1* | 5/2011 | Agarwal | G06F 21/53 |
| | | | 718/1 |
| 2014/0283032 A1* | 9/2014 | Rash | G06F 21/57 |
| | | | 726/22 |
| 2018/0004954 A1* | 1/2018 | Liguori | H04L 9/3239 |
| 2018/0046796 A1* | 2/2018 | Wright | G06F 21/45 |
| 2018/0211054 A1* | 7/2018 | Costa | G06F 21/57 |

\* cited by examiner

INTEGRITY ASSURANCE OF A SECURED VIRTUAL ENVIRONMENT

FIELD

This disclosure relates generally to Information Handling Systems (IHSs), and more specifically, to security for virtual environments utilized by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An enterprise may employ a wide variety of IHSs within an enterprise system. An enterprise system utilizes IHSs to provide employees with access to the tools and business data required to perform their job functions. An enterprise system is required to support employee productivity, while also placing paramount importance on protecting business data, both from loss and misuse. The difficulty of supporting employee productivity while protecting business data has been greatly compounded by the advent of the modern workplace settings in which employees may expect to access business data from a variety of different locations and are not restricted to the use of a single IHS.

One of the difficulties in securing a modern enterprise system is detecting and mitigating the effects of an employee accessing business data from an IHS that has been compromised. Malicious software, such as computer viruses, may be surreptitiously or unintentionally installed on an IHS utilized by an employee. One tactic employed by such malicious software programs is to appropriate data that is stored by an IHS. Such data thefts may provide malicious actors with valuable financial information and information that may be used in identity thefts. Another tactic employed by malicious actors is the use of ransomware that infects an IHS and encrypts data stored by the IHS. The malicious actor may then extort a ransom in order for the owner of the IHS to regain access to the encrypted data.

SUMMARY

In various embodiments, a method for hosting a secured virtual environment on an Information Handling System (IHS) includes: accessing one or more policies stored in a secured memory of the IHS, wherein the one or more policies specify access to secured data by a first user of the IHS; requesting a trusted resource to validate the integrity of the IHS; if the integrity of the IHS is validated, configuring a virtual environment for the first user according to the one or more policies, wherein the configured virtual environment includes resources for access to the secured data by the first user; launching the configured virtual environment; and during operation of the launched virtual environment, periodically requesting the trusted resource to confirm the integrity of the IHS and periodically identifying any changes to the one or more policies stored in the secured memory.

In various additional embodiments of the method, the trusted resource is a trusted controller of the IHS and the secured memory is a component of the trusted controller. In various additional embodiments of the method, the validation of the integrity of the IHS by the trusted resource comprises calculating signatures for one or more hardware components of the IHS and comparing the calculated signatures against reference signatures for the respective one or more components. In various additional embodiments, the method also includes determining a reference signature of the configured virtual environment; and storing the reference signature to the secured memory. In various additional embodiments, the method also includes, during operation of the launched virtual environment, periodically determining a signature for the launched virtual environment and comparing the determined signature against the reference signature for the virtual environment. In various additional embodiments, the method also includes revoking access to the secured data via the virtual environment if the periodically determined signature for the launched virtual environment does not match the reference signature for the virtual environment. In various additional embodiments of the method, the virtual environment isolates the secured data from the operating system of the IHS.

In various embodiments, an Information Handling System (IHS) includes one or more processors; a secured memory; a trusted controller configured to validate the integrity of the IHS and store one more policies to the secured memory wherein the one or more policies specify access to secured data by a first user of the IHS; a system memory coupled to the one or more processors, the system memory including program instructions stored thereon that, upon execution by the one or more processors, cause the IHS to: access the one or more policies stored in the secured memory; request the trusted controller to validate the integrity of the IHS; if the integrity of the IHS is validated, configure a virtual environment for the first user according to the one or more policies, wherein the configured virtual environment includes resources for access to the secured data by the first user; launch the configured virtual environment; and during operation of the launched virtual environment, periodically request the trusted controller to confirm the integrity of the IHS and periodically identify any changes to the one or more policies stored in the secured memory.

In various additional embodiments of the IHS, the secured memory is a component of the trusted controller. In various additional embodiments of the IHS, the validation of the integrity of the IHS by the trusted controller comprises calculating signatures for one or more hardware components of the IHS and comparing the calculated signatures against reference signatures for the respective one or more components. In various additional embodiments of the IHS the program instructions further causing the one or more processors to: determine a reference signature of the configured virtual environment; and store the reference signature of the configured virtual environment to the secured memory. In various additional embodiments of the IHS, the program instructions further causing the one or more processors to: during operation of the launched virtual environment, periodically determine a signature for the launched virtual environment and compare the determined signature against the reference signature for the virtual environment. In various additional embodiments of the IHS, the program instructions further causing the one or more processors to: revoke access to the secured data via the virtual environment if the periodically determined signature for the launched virtual environment does not match the reference signature for the virtual environment. In various additional embodiments of the IHS, the virtual environment isolates the secured data from the operating system of the IHS In various embodiments, a computer-readable storage device includes program instructions stored thereon for hosting a secured virtual environment on an Information Handling System (IHS). Upon execution by one or more processors of the IHS, the program instructions cause the one or more processors to: access one or more policies stored in a secured memory of the IHS, wherein the one or more policies specify us of a secured application by a first user of the IHS; request a trusted resource to validate the integrity of the IHS; if the integrity of the IHS is validated, configure a virtual environment for the first user according to the one or more policies, wherein the configured virtual environment provides use of the secured application to the first user; launch the configured virtual environment; and during operation of the launched virtual environment, periodically request the trusted resource to confirm the integrity of the IHS and periodically identifying any changes to the one or more policies stored in the secured memory.

In various additional embodiments of the computer-readable storage device, the validation of the integrity of the IHS by the trusted resource comprises calculating signatures for one or more hardware components of the IHS and comparing the calculated signatures against reference signatures for the respective one or more components. In various additional embodiments of the computer-readable storage device, the program instructions further causing the one or more processors of the IHS to: determine a reference signature of the configured virtual environment; and store the reference signature to the secured memory. In various additional embodiments of the computer-readable storage device, the program instructions further causing the one or more processors of the IHS to, during operation of the launched virtual environment, periodically determine a signature for the launched virtual environment and compare the determined signature against the reference signature for the virtual environment. In various additional embodiments of the computer-readable storage device, the secured application is bound to the configured virtual environment by associating the secured application with the reference signature of the configured virtual environment. In various additional embodiments of the computer-readable storage device, the program instructions further causing the one or more processors of the IHS to revoke access to the secured application via the virtual environment if the periodically determined signature for the launched virtual environment does not match the reference signature for the virtual environment.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
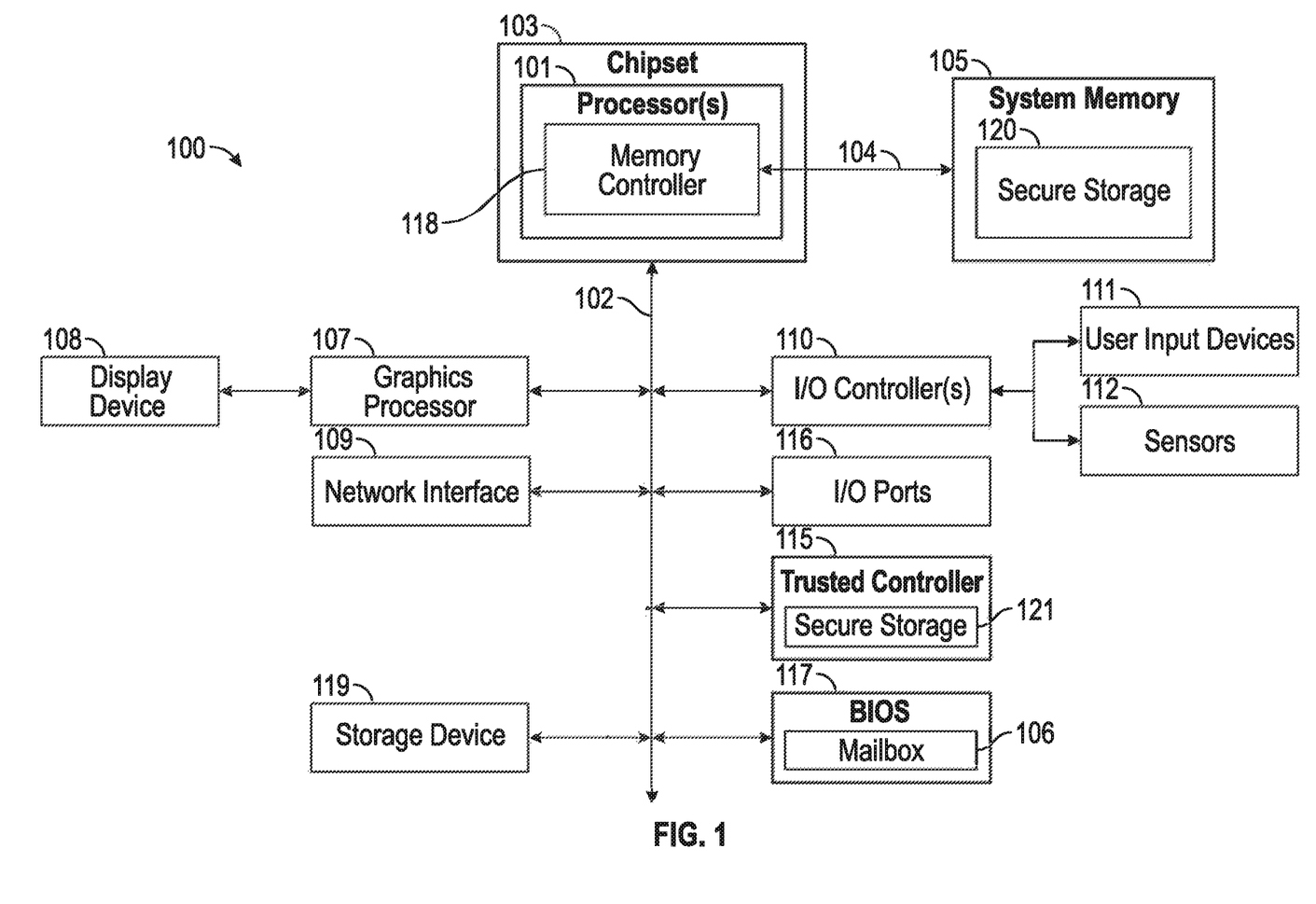
FIG. 1 is a block diagram depicting certain components of an IHS configured according to various embodiments to host a secured virtual environment.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 illustrates certain components of an IHS 100 configured according to certain embodiments to utilize a secured virtual environment, where the integrity of the IHS hosting the virtual environment may be assured from the time the IHS 100 is booted, and may be further assured on an ongoing basis during the operation of the secured virtual environment. In various embodiments, IHS 100 may execute program instructions that cause IHS 100 to perform certain of the operations disclosed herein. While a single IHS 100 is illustrated in FIG. 1, IHS 100 may be a component of an enterprise system that may include any number of additional IHSs that may also utilize the described secured virtual environments in the same or similar manner to IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 includes a secured storage 120 that may be a portion of the system memory designated for storage of information, such as access policies, for use in hosting a secured virtual environment that runs within the operating system of IHS 100. In such embodiments, a signature may be calculated based on the contents of the secured storage 120 and stored as a reference signature. The integrity of the data stored in the secured storage 120 may then be validated at a later time by recalculating this signature of the contents of the secured storage and comparing the recalculated signature against the reference signature.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH.

Chipset 103 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 111 such as a keyboard, mouse, touchpad, touchscreen and/or other peripheral input devices. The user input devices may interface with the I/O controller 110 through wired or wireless connections. Sensors 112 accessed via I/O controllers 110 may provide access to data describing environmental and operating conditions of IHS 100. Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiments, BIOS 117 includes a predefined memory or memory region that may be referred to as a NVM (Non-Volatile Memory) mailbox 106. In such embodiments, the mailbox 106 may provide a secured storage location for use in storing workspace access policies, reference signatures or other data utilized to host a secured virtual environment on IHS 100. In certain embodiments, the BIOS mailbox 106 may be utilized as a secured storage utilized by a trusted attestation service running on IHS 100 in order to store access policies and signatures for use in validating the integrity of a secured workspace hosted by IHS. BIOS mailbox 106 may be utilized in this manner instead of, or in conjunction with, integrity validations implemented by trusted controller 115.

In the illustrated embodiment, a trusted controller 115 is coupled to IHS 100. In certain embodiments, the trusted controller 115 is an embedded controller that is installed as a component of the motherboard of IHS 100. In certain embodiments, trusted controller 115 may be a Trusted Platform Module that is configured to verify the integrity of certain components of IHS 100 and to provide a secured storage 121 that may be utilized in hosting a secured virtual environment on IHS 100. For instance, trusted controller 115 may be configured to calculate signatures that uniquely identify individual components of IHS 100. Trusted controller 115 may calculate a hash value based on the configuration of a hardware component coupled to IHS 100. For instance, trusted controller 115 may calculate a hash value based on all firmware and other code or settings stored in an onboard memory of a hardware component, such as a network interface 109. Such a hash value may be maintained in the secured storage 121 as a reference signature. The trusted controller 115 may be further configured to recalculate a hash value at a later time for such a component. The hash value recalculated for the component may then be compared against the reference hash value signature in order to determine if any modifications have been made to a component, thus indicating the component has been compromised. In various embodiments, the trusted controller 115 may be used to validate the integrity of hardware and software components installed on IHS 100.

In various embodiments, an IHS 100 does not include all of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the processor 101 as systems-on-a-chip.

Figure 2:
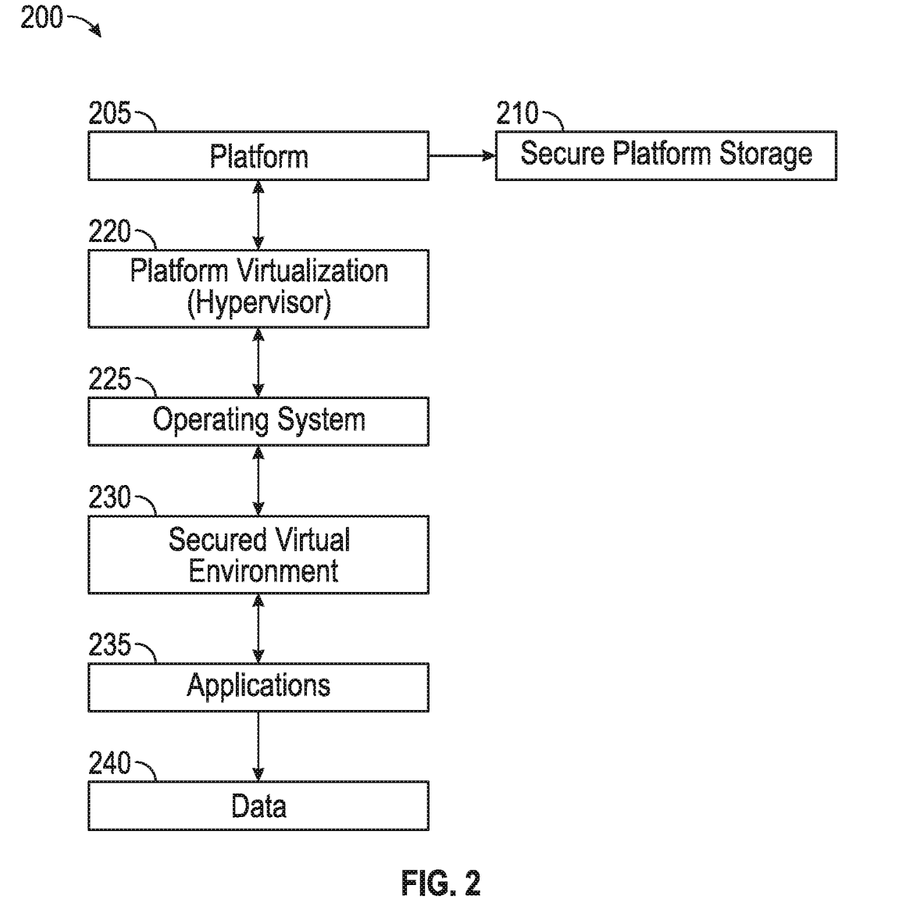
FIG. 2 is a block diagram depicting certain components of a system configured according to various embodiments to host a secured virtual environment.

FIG. 2 is block diagram illustrating certain components of a system 200 implementing a secured virtual environment 230 according to various embodiments. As illustrated, at one end of the system 200 is the platform 205 from which a user will be accessing the secured data 240 and/or a secured software application 235. In certain embodiments, the platform 205 may be implemented by the hardware, firmware and software of an IHS, such as IHS 100 described with respect to FIG. 1. Accordingly, platform 205 may be a personal computing device, such as a laptop, desktop, tablet, 2-in-1 convertible device, or a smart phone, capable of interfacing with an enterprise system and hosting a secured virtual environment 230. As described with regard to FIG. 1, an IHS may include one or more secured data storages. For example, the secured platform data storage 210 may be implemented as a secured storage 121 of a trusted controller 115 that operates independently of the operating system of the IHS 100. Also as described with respect to FIG. 1, an IHS 100 may implement one or more secured storages, such as a designated secured memory area of the system memory 105 or as a mailbox storage of BIOS 117. Referring back to FIG. 2, platform 205 similarly includes a secured platform storage 210 that is independent of operating system 225.

In the embodiment of FIG. 2, platform 205 supports a platform virtualization layer 220, which may be referred to in certain scenarios as a hypervisor. The platform virtualization layer 220 allows multiple virtual machines to run concurrently on platform 205, where each virtual machine may host a different instantiated operating system 225. The hypervisor 220 provides a virtual machine container that presents a logical hardware interface to the operating system (s) 225 installed on platform 205. By utilizing a platform virtualization layer 220, multiple different operating systems 225 may run concurrently on a single platform 205, while isolating the operating system 225 from the hardware and firmware used to implement platform 205.

In certain scenarios, the system 200 of FIG. 2 may be a component of an enterprise computing system by which an enterprise may provide users with controlled access to secured data 240 via one or more software applications 235. In certain scenarios, one or more of the software applications 235 installed on platform 205 may be secured such that user are provided with controlled access to these software applications. In the illustrated embodiment, users are provided access to secured data 240 and/or secured software applications 235 via a secured virtual environment 230 provided within an operating system 225 installed on platform 205. The secured virtual environment 230 includes tools and resources necessary for a particular user to access secured data 240 and/or a secured application 235 according to policies that specify restrictions on the user's access. In this manner, an enterprise user may be provided with access to enterprise data and the tools necessary for user to perform job functions involving enterprise data or applications, thus promoting the user's productivity, while maintaining the secured data 240 and/or secured software application 235 protected within the secured virtual environment 230. In certain scenarios, the described virtual environment may be referred to as a workspace.

Figure 3:
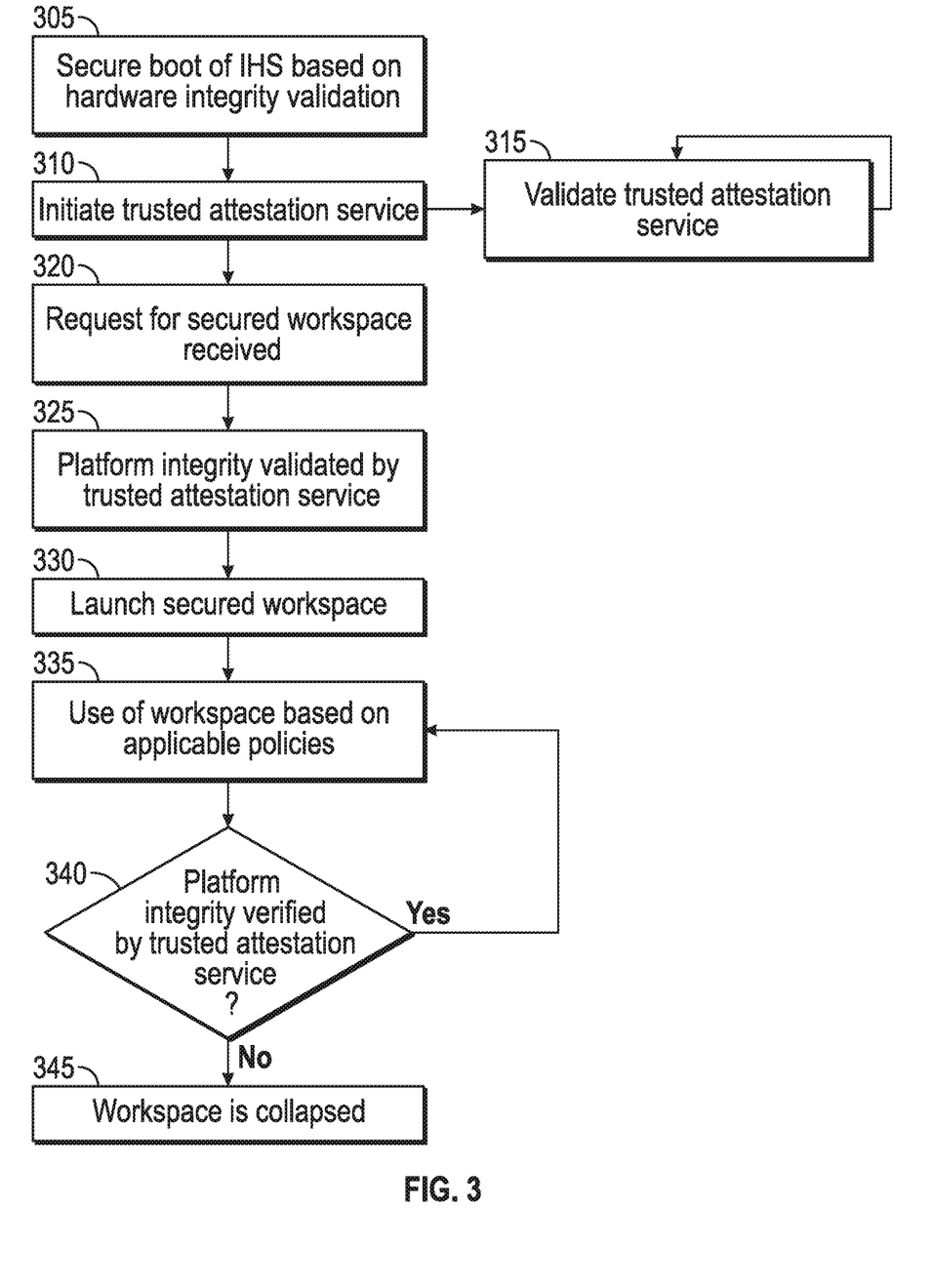
FIG. 3 is a flowchart diagram depicting certain steps of a process for configuring a secured virtual environment according to various embodiments.
Figure 4:
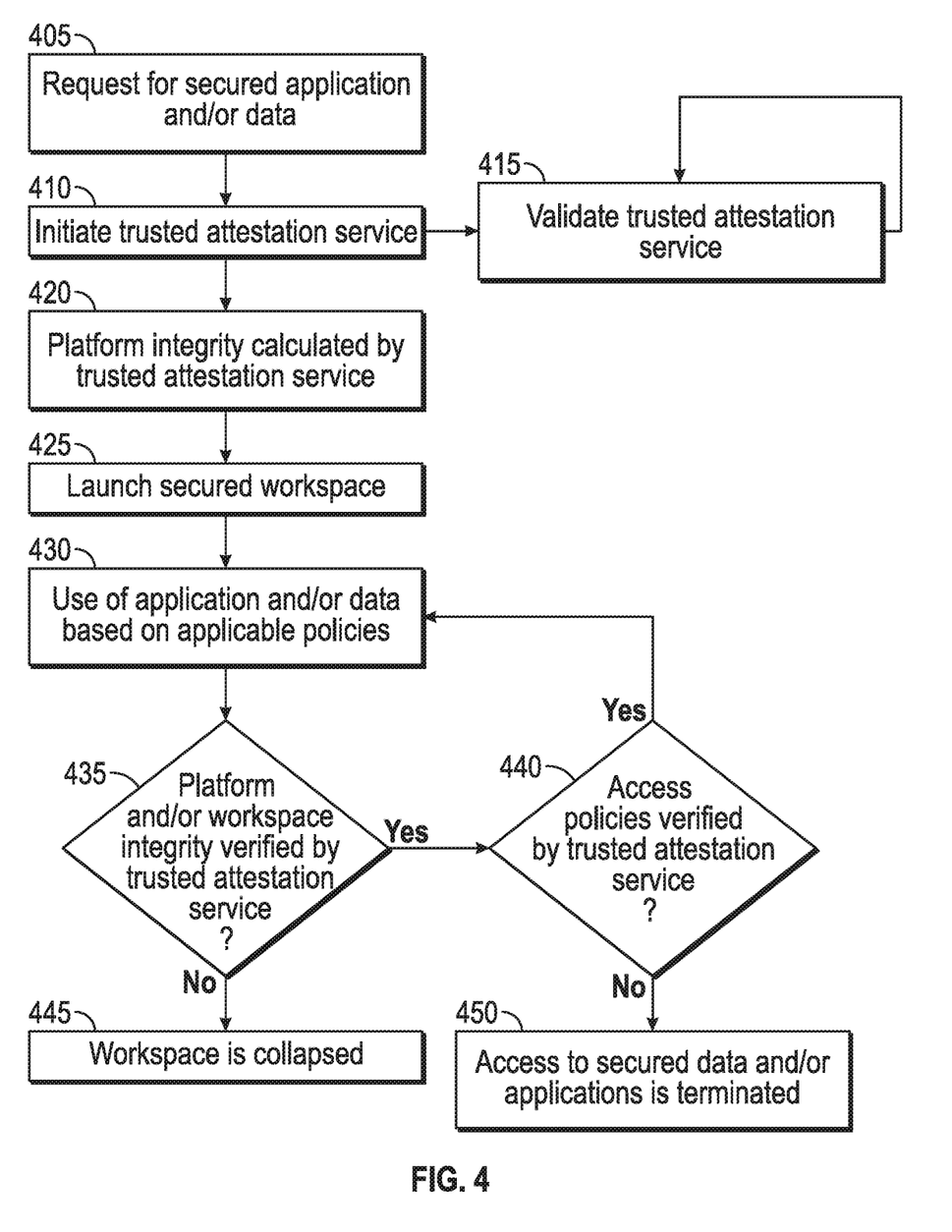
FIG. 4 is a flowchart diagram depicting certain steps of a process for configuring access to secured applications and/or data according to various embodiments.

As described in additional detail with regard to the embodiments of FIGS. 3 and 4, the integrity of platform 205 and of the secured virtual environment 230 may be verified at the time the secured virtual environment 230 is launched, and may also be re-verified on an ongoing basis throughout the use of the secured virtual environment 230. In certain scenarios, the integrity of platform 205 may be verified retroactively, even if the secured virtual environment is being launched long after platform 205 has been booted. Also as described in addition detail below, the initial and ongoing verification of the integrity of the secured virtual environment 230 may be implemented via a trusted attestation service that may verify the integrity of certain hardware and/or software components of platform 205, thus providing assurance that these components have not been compromised. The trusted attestation service may verify the hardware integrity of platform 205 without reliance on the installed operating system 225. The trusted attestation service may itself be subject to validation and may rely on the secured platform storage 210 of the platform 205.

FIG. 3 illustrates certain steps of a process according to various embodiments for launching and running a secured virtual environment that provides a user with access to secured data and/or a secured application. In the illustrated embodiment, the process begins at step 305 with the secured boot of the IHS. In certain embodiments, the IHS may be similar to IHS 100 of FIG. 1 and platform 205 of FIG. 2. As described with regard to FIG. 1, an IHS may utilize a trusted controller 115 for verifying the hardware integrity of the IHS immediately upon booting of the IHS and before initialization of the operating system. For instance, the trusted controller 115 may calculate a signature for certain hardware components of the IHS immediately upon booting, thus providing a reference signature for each of these hardware components. These reference signatures may then be used by attestation service to identify a component that has been compromised when recalculating the signature of a component at a later time yields a signature that differs from the reference signature for that component.

With the hardware integrity of the IHS verified and the IHS securely booted, at step 310 the trusted attestation service is initiated. The trusted attestation service may be a process that periodically verifies the hardware integrity of the running IHS, in certain instances via queries to a platform-level resource, such as trusted controller 115 of FIG. 1, which may an integrated component of the motherboard of the IHS. In certain embodiments, the trusted attestation service may run as a process of the booted operating system of the IHS. In other embodiments, the trusted attestation service may run externally to the operating system, such as a process that runs on a trusted resource. For example, the trusted attestation service may run as a process of trusted controller 115 of FIG. 1. As illustrated, certain embodiments may be configured at step 315 to implement periodic validations of the trusted attestation service in order to verify the integrity of the attestation service itself.

At step 320, a request for a secured workspace is received. In certain embodiments, the request for a secured workspace may be automatically initiated as part of the startup procedures implemented by the IHS. For instance, the IHS being utilized may be configured to launch a secured workspace as a default software application that is launched upon initialization of the operating system. In such scenarios, the secured workspace may be launched by default based on policies that are applicable to the user and/or the IHS. For instance, enterprise workspace policies may specify the default launch of a workspace for users that are supported by the enterprise system. Certain employees or groups of employees may require access to secured applications and data as part of their core job functions. Accordingly, upon booting of an IHS by such employees, a default workspace may be automatically initiated. In certain embodiments, a default workspace may be launched based on the specifications of the IHS being used by the individual. For instance, enterprise workspace policies may launch a default workspace for an individual booting a laptop, but may refrain from launching a default workspace when that same individual is booting a smart phone. In other embodiments, a request for a secured workspace may be received at step 320 via a request initiated by a user of the securely booted IHS via the operating system of the IHS.

Prior to launching a secured workspace, either as a default configuration or by request, the trusted attestation service may be utilized at step 325 to validate the integrity of the IHS. The trusted attestation service may query various components of the IHS in order to calculate signatures of the queried components, which may then be compared against the reference signatures determined during the secured booting of the IHS and maintained in a secured storage of the IHS. In certain embodiments, the trusted attestation service may rely on a platform-level resource, such as the trusted controller 115 of FIG. 1 to calculate signatures and determine whether the calculated signatures differ from the reference signature generated during the secured booting of the IHS. The trusted attestation service thus ensures the launching of a workspace within a secured operating environment that can be verified as being uncompromised. As described, the security of the platform may be validated retroactively, even though the request for a secured workspace may be issued at step 320, well after booting of the IHS.

If the integrity of the IHS is properly validated, at step 330 the secured workspace may then be launched. As described, a secured workspace may be a virtual environment launched within the operating system of the IHS. In certain embodiments, the secured workspace may be a software application comprised of one more processes running within the operating system of the IHS. In certain embodiments, the secured workspace may be a remote application that runs remotely from the IHS, with only a graphical interface that allows the user to interact with the secured workspace running locally on the IHS. In other embodiments, the secured workspace may be launched within another application running in the operating system of the IHS, such as within a web browser. As described, a secured workspace may include resources, such as libraries, cryptographic resources, and binaries, that are required for the use of secured applications and/or secured data within the secured workspace. Configured in this manner, the secured workspace protects enterprise data within a secured environment that is isolated from the operating system, while still providing the user with the resources necessary to perform job functions that require access to enterprise data.

With the secured workspace configured and launched, at step 335 the user may utilize secured applications and access secured data according to policies that set forth restrictions applicable to the user and/or to the IHS hosting the secured workspace. At step 340, the integrity of the IHS may be periodically verified by the trusted attestation service in order to ensure that the IHS hosting the secured workspace has not been compromised. As described with regard to FIG. 1, embodiments may utilize a trusted controller 115 that is configured to ensure the integrity of components of the IHS by calculating signatures for various components of the IHS and to compare the calculated signatures against previously calculated reference signatures for each respective component.

In certain embodiments, the integrity of the secured workspace may be similarly validated at step 340. For instance, a signature may be calculated based on a configured secured workspace prior to its launching. This initial signature may thus serve as a reference signature that can be compared against signatures that are periodically calculated based on the initialized secured workspace at step 340. In this manner, the integrity of a secured workspace may be periodically confirmed in order to ensure that the secured workspace has not been compromised and the secured data remains within the isolated container provided by the secured workspace.

As illustrated, if the integrity of the platform is confirmed at step 340, the user may continue use of the secured data and/or secured applications at step 335 until the subsequent periodic verification of the platform integrity. If the integrity of the platform cannot be confirmed by the trusted attestation service, at step 345 the secured workspace may be collapsed, in which case user's access to secured data and/or applications on the platform may be immediately terminated. The workspace may be similarly collapsed upon any determination at step 340 that the launched secured workspace has been compromised as indicated by a determination made by a trusted resource, such as trusted controller 115 of FIG. 1.

FIG. 4 illustrates certain steps of a process to various embodiments or launching and running a secured virtual environment that provides an individual with access to secured data and/or secured application and monitors for any policy changes indicating that such access should be revoked or altered. In certain embodiments of the process, access to secured data and/or applications may be provided to a user of an IHS such as IHS 100 of FIG. 1 and platform 205 of FIG. 2, where the IHS is configured to provide a secured virtual environment for access to the requested secured data and/or applications.

An embodiment may begin at step 405 with the receipt of a request for access to a secured application and/or secured data. As described, access to enterprise data may be protected via a secured virtual environment such that the enterprise data remains isolated from un-trusted software applications. Similarly, certain enterprise software applications may be similarly protected within a secured virtual environment. For instance, a software application that provides access to enterprise data or that generates enterprise data may be protected in this manner. Other software applications that may be secured may include proprietary tools or other software applications to be provided by the enterprise according to controlled and monitored access policies.

In response to the receipt of a request for secured data and/or applications, at step 410 a trusted attestation service may be initiated. As with the embodiment of FIG. 3, the trusted attestation service may be a process that periodically verifies the hardware integrity of the IHS, verifies the integrity of operating workspace and monitors for any changes to policies that would affect a user's access to secured data and/or applications. In certain embodiments, the trusted attestation service may run within the operating system of an IHS. In other embodiments, the trusted attestation service may operate externally to the operating system of the IHS, such as trusted controller 115 of FIG. 1. Regardless of where the trusted attestation service runs, as illustrated at step 415, certain embodiments may be configured to periodically verify the integrity of the trusted attestation service itself, such as by calculating a signature of the trusted attestation service and comparing it to a reference signature for the service.

At step 420, the trusted attestation service validates the integrity of the IHS. As described, the trusted attestation service may query a trusted component of the IHS, such as in trusted controller 115 of FIG. 1, in order to validate the integrity of various software and hardware components of the IHS based on the ability to recalculate the reference signatures that unique identify each of the various software and hardware components. The trusted attestation service thus ensures the launching of a workspace on a platform that has no indication of being corrupted or compromised. As described, in effect, the security of the platform may thus be validated retroactively based on the secured booting of the IHS during which the reference signatures may be determined.

If the integrity of the IHS is validated, at step 425 the secured workspace may be launched, where the secured workspace has been configured to provide the user with access to the requested secured data and/or applications. As described, a secured workspace may be a virtual environment launched within the operating system of the IHS as an application, or a remote application with only a graphical interface running on the IHS, or within a container application, such as a web browser. The secured workspace includes all software libraries, binaries, tools and resources for secure communications and other resources necessary for the user to utilize the secured data and/or applications, while isolated from the operating system of the IHS. At step 430 the user may utilize the secured applications and secured data within the launched secured workspace, where the use is subject to policies that set forth restrictions on the user and/or on the IHS hosting the secured application and/or data.

At step 435, the integrity of the IHS may be periodically verified by the trusted attestation service in order to ensure that the IHS hosting the secured workspace has not been compromised. As described, embodiments may utilize the trusted attestation service to query a trusted controller 115 that is configured to validate the integrity of various hardware and/or software components that comprise the IHS that is hosting the secured workspace. If the integrity of the platform cannot be confirmed, at step 445, the secured workspace may be collapsed in order to immediately terminate the user's access to the secured data and/or applications.

In certain embodiments, the integrity of the secured workspace may be similarly validated at step 435 by the trusted attestation service. In certain embodiments, the trusted attestation service may rely on the trusted controller 115 in the validation of the integrity of the workspace at 435. In other embodiments, the trusted attestation service may independently utilize a secured storage, such as secured mailbox 106 storage of BIOS 117 in FIG. 1, to independently calculate and securely store a reference signature of the workspace to be compared against signatures calculated during the periodic validations of the secured workspace at step 435.

If the platform and/or workspace are successfully validated, in certain embodiments, the access policies applicable to the user of the IHS may be similarly validated at step 440 by the trusted attestation service. As described, policies maintained in a secured storage of the IHS, such as the BIOS mailbox 106 and trusted controller storage 121, may specify restrictions on secured data and/or applications. Such policies may be specific to an individual user of the enterprise system or may apply to types of users. Access control policies may be altered for a variety of reasons. For instance, a user's access to secured data and/or applications may expire based on a configured timer. A user's access may also be changed to grant a user with access to additional secured data and/or applications. A user's access to a secured applications and/or data may be revoked based on indications of suspicious activity by a user or by the IHS hosting the secured workspace. At step 440, any such changes to the access policies maintained in the secured storage may be detected by the trusted attestation service.

If the access policies in secured storage are successfully validated, the user retains access to the secured data and/or applications at step 430. In certain scenarios, where additional access to secured data and/or applications has been identified in the applicable policies, the secured workspace may be configured to provide the user with access at step 430 to this additional secured data and/or application. If a change in the access policies correspond to a revocation of certain access to secured data and/or applications, at step 450 access to the secured data and/or applications on the platform may be immediately revoked. In certain scenarios, the secured workspace may be collapsed in order to immediately terminate the user's access to the secured workspace. Configured in this manner, the secured workspace protects enterprise data within a secured virtual environment that is isolated from the operating system and that is validated on an ongoing basis during the operation of the secured environment. The secured workspace that provided protected access to enterprise data, while providing the user with the resources necessary to perform job functions that require access to enterprise data.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for hosting a secured virtual environment on an Information Handling System (IHS), the method comprising:
   receiving, by an attestation service operating on a trusted controller of the IHS, a request for providing a first user with access to secured data stored in a secured memory of the trusted controller;
   validating, by the attestation service operating on the trusted controller, an integrity of the IHS based on signatures stored in the secured memory of the trusted controller;
   upon the validation of the integrity of the IHS by the trusted controller, calculating a reference signature for a virtual environment that provides the first user with access to the secured data stored in the secured memory of the trusted controller, where the access is provided according to policies stored in the secured memory of the trusted controller that determine the first user's access to the secured data stored in the secured memory of the trusted controller;
   upon calculating the reference signature for the virtual environment, launching the virtual environment that provides access to the secured data stored in the secured memory of the trusted controller by the first user in isolation from one or more operating systems of the IHS; and
   during operation of the launched virtual environment, periodically confirming the integrity of the virtual environment by the attestation service operating on the trusted controller and periodically identifying, by the attestation service operating on the trusted controller, any changes to the one or more policies stored in the secured memory of the trusted controller, wherein the policy changes indicate a change in the access to the secured data stored in the secured memory of the trusted controller by the first user, wherein the periodic confirmation of the integrity of the virtual environment comprises validating the integrity of the attestation service operating on the trusted controller by comparing a signature calculated based on instructions utilized by the attestation service against a reference signature stored in the secured memory of the trusted controller, and further comprises validating the integrity of the virtual environment by comparing a signature calculated based on instructions in use by the virtual environment against the reference signature calculated prior to launching the virtual environment.

2. The method of claim 1, wherein the secured memory of the trusted controller comprises a non-volatile memory of the trusted controller of the IHS, and wherein the signatures stored to the non-volatile trusted controller memory used to validate the integrity of the IHS comprise signatures corresponding to instructions utilized by one or more hardware components of the IHS.

3. The method of claim 1, wherein the validation of the integrity of the IHS by the trusted controller comprises calculating signatures for one or more hardware components of the IHS and comparing the calculated signatures against reference signatures for the respective one or more components, wherein the reference signatures are calculated by the attestation service operating on the trusted controller upon booting of the IHS and are stored by the attestation service operating on the trusted controller to the secured memory of the trusted controller prior to initialization of the one or more operating systems of the IHS.

4. The method of claim 1, wherein the reference signature for the virtual environment is calculated based on all software libraries, binaries, tools and resources for secure communications necessary for the first user to utilize the secured data stored in the secured memory of the trusted controller while isolated from the one or more operating systems of the IHS.

5. The method of claim 1, further comprising:
   terminating, by the attestation service operating on the trusted controller, the virtual environment when the periodic confirmation of the integrity of the virtual environment providing access to the secured data in the secured memory of the trusted controller is not successful.

6. The method of claim 1, further comprising:
   revoking, by the attestation service operating on the trusted controller, access to the secured data in the secured memory of the trusted controller via the virtual environment when the periodic confirmation of the integrity of the virtual environment is not successful.

7. The method of 1, wherein the changes to the one or more policies comprise changes resulting from an expiration of a configured timer that limits the duration of the first user's access to the secured data in the secured memory of the trusted controller.

8. An Information Handling System (IHS), comprising:
   one or more processors;
   one or more memory components utilized for running one or more operating systems of the IHS;

a trusted controller comprising a secured memory, where the trusted controller is configured to validate the integrity of the IHS and store one more policies to the secured memory, wherein the one or more policies specify access to secured data by a first user of the IHS, and wherein an attestation service operated by the trusted controller is configured to:
- receive a request for providing a first user with access to secured data stored in the secured memory of the trusted controller;
- validate an integrity of the IHS based on signatures stored in the secured memory of the trusted controller;
- upon the validation of the integrity of the IHS, calculate a reference signature for a virtual environment that provides the first user with access to the secured data stored in the secured memory of the trusted controller according to policies stored in the secured memory of the trusted controller that determine the first user's access to the secured data;
- upon calculating the reference signature for the virtual environment, launch the virtual environment that provides access to the secured data stored in the secured memory of the trusted controller by the first user in isolation from the one or more operating systems of the IHS; and
- during operation of the launched virtual environment, periodically confirm the integrity of the virtual environment and periodically identify any changes to the one or more policies stored in the secured memory of the trusted controller, wherein the policy changes indicate a change in the access to the secured data by the first user, and wherein the periodic confirmation of the integrity of the virtual environment comprises validating the integrity of the attestation service by comparing a signature calculated based on instructions utilized by the attestation service against a reference signature stored in the secured memory of the trusted controller and further comprises validating the integrity of the virtual environment by comparing a signature calculated based on instructions in use by the virtual environment against the reference signature calculated prior to launching the virtual environment.

9. The IHS of claim 8, wherein the secured memory of the trusted controller comprises a non-volatile memory of the trusted controller of the IHS, and wherein the signatures stored to the non-volatile trusted controller memory used to validate the integrity of the IHS comprise signatures corresponding to instructions utilized by one or more hardware components of the IHS.

10. The IHS of claim 8, wherein the validation of the integrity of the IHS by the trusted controller comprises calculating signatures for one or more hardware components of the IHS and comparing the calculated signatures against reference signatures for the respective one or more components, wherein the reference signatures are calculated by the trusted controller upon booting of the IHS and stored to the secured memory of the trusted controller prior to initialization of the one or more operating systems of the IHS.

11. The IHS of claim 8, wherein the reference signature for the virtual environment is calculated based on all software libraries, binaries, tools and resources for secure communications necessary for the first user to utilize the secured data stored in the secured memory of the trusted controller while isolated from the one or more operating systems of the IHS.

12. The IHS of claim 8, wherein the attestation service operating on the trusted controller is further configured to:
- terminate the virtual environment when the periodic confirmation of the integrity of the virtual environment is not successful.

13. The IHS of claim 8, wherein the attestation service operating on the trusted controller is further configured to:
- revoke access to the secured data stored in the secured memory of the trusted controller via the virtual environment when the periodic confirmation of the integrity of the virtual environment is not successful.

14. The IHS of claim 8, wherein the changes to the one or more policies comprise changes resulting from an expiration of a configured timer that limits the duration of the first user's access to the secured data in the secured memory of the trusted controller.

15. One or more non-transitory computer-readable storage media storing program instructions that when executed on or across one or more processors of a trusted controller of an Information Handling System (IHS), cause the one or more processors to:
- receive, by an attestation service of the trusted controller, a request for providing a first user with access to secured data stored in a secured memory of the trusted controller;
- validate, by the attestation service of the trusted controller, an integrity of the IHS based on signatures stored in the secured memory of the trusted controller;
- upon the validation of the integrity of the IHS, calculate a reference signature for a virtual environment that provides the first user with access to the secured data stored in the secured memory of the trusted controller according to policies stored in the secured memory of the trusted controller that determine the first user's access to the secured data stored in the secured memory of the trusted controller;
- upon calculating the reference signature for the virtual environment, launch the virtual environment that provides use of the secured data stored in the secured memory of the trusted controller to the first user in isolation from one or more operating systems of the IHS; and
- during operation of the launched virtual environment, periodically confirm the integrity of the virtual environment and periodically identifying any changes to the one or more policies stored in the secured memory of the trusted controller, wherein the policy changes indicate a change in the access to the secured data stored in the secured memory of the trusted controller by the first user, and wherein the periodic confirmation of the integrity of the virtual environment comprises validating the integrity of the attestation service by comparing a signature calculated based on instructions utilized by the attestation service against a reference signature stored in the secured memory of the trusted controller, and further comprises validating the integrity of the virtual environment by comparing a signature calculated based on instructions in use by the virtual environment against the reference signature calculated prior to launching the virtual environment.

16. The one or more non-transitory computer-readable storage media of claim 15, wherein the validation of the integrity of the IHS by the trusted resource comprises calculating signatures for one or more hardware components of the IHS and comparing the calculated signatures against reference signatures for the respective one or more components, wherein the reference signatures are calculated by the attestation service upon booting of the IHS and stored to the secured memory of the trusted controller prior to initialization of the one or more operating systems of the IHS.

17. The one or more non-transitory computer-readable storage media of claim 15, wherein the reference signature for the virtual environment is calculated based on all software libraries, binaries, tools and resources for secure communications necessary for the first user to utilize the secured data stored in the secured memory of the trusted controller while isolated from the one or more operating systems of the IHS.

18. The one or more non-transitory computer-readable storage media of claim 15, the program instructions further causing the attestation service to:
 terminate the virtual environment when the periodic confirmation of the integrity of the virtual environment is not successful.

19. The one or more non-transitory computer-readable storage media of claim 15, wherein the changes to the one or more policies comprise changes resulting from an expiration of a configured timer that limits the duration of the first user's access to the secured data in the secured memory of the trusted controller.

20. The one or more non-transitory computer-readable storage media of claim 19, the program instructions further causing the attestation service to: revoke access to the secured data stored in the secured memory of the trusted controller via the virtual environment when the periodic confirmation of the integrity of the virtual environment is not successful.

\* \* \* \* \*